(12) United States Patent
Reith et al.

(10) Patent No.: US 8,549,695 B2
(45) Date of Patent: Oct. 8, 2013

(54) WINDOW WIPER DEVICE FOR A VEHICLE

(75) Inventors: Michael Reith, Buehl-Vimbuch (DE); Roland Bohn, Buehl (DE); Orlando Sterns, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 427 days.

(21) Appl. No.: 12/952,339

(22) Filed: Nov. 23, 2010

(65) Prior Publication Data
US 2011/0119856 A1 May 26, 2011

(30) Foreign Application Priority Data

Nov. 23, 2009 (DE) .................. 10 2009 046 979

(51) Int. Cl.
*B60S 1/58* (2006.01)
*B60S 1/18* (2006.01)
(52) U.S. Cl.
USPC ....................................... 15/250.3; 15/250.31

(58) Field of Classification Search
USPC ................ 15/250.3, 250.31, 250.19, 250.16, 15/250.001; 296/96.15, 96.17
See application file for complete search history.

(56) References Cited

U.S. PATENT DOCUMENTS

| 2,046,108 | A  | * | 6/1936  | Drew ........................... 15/250.3 |
| 6,240,593 | B1 | * | 6/2001  | Murata ......................... 15/250.3 |
| 2004/0216259 | A1 | * | 11/2004 | Ponziani ....................... 15/250.3 |
| 2008/0307601 | A1 | * | 12/2008 | Kamiya et al. ............... 15/250.3 |
| 2012/0186034 | A1 | * | 7/2012  | Dallos et al. ............... 15/250.31 |

FOREIGN PATENT DOCUMENTS

WO   WO2005/009812   * 2/2005

* cited by examiner

*Primary Examiner* — Gary Graham
(74) *Attorney, Agent, or Firm* — Michael Best & Friedrich LLP

(57) ABSTRACT

A window wiper device for a vehicle has a driving motor, the motor shaft of which is kinematically coupled to an output shaft, wherein the motor shaft and output shaft are releasably drive-connected via a connecting means.

16 Claims, 6 Drawing Sheets

WINDOW WIPER DEVICE FOR A VEHICLE

BACKGROUND OF THE INVENTION

The invention relates to a window wiper device for a vehicle.

Known window wiper devices comprise an electric driving motor, the motor shaft of which is kinematically coupled to an output shaft carrying a wiper arm, wherein a wiper blade which is fastened to the wiper arm rests on the vehicle window to be cleaned. In the case of window wiper devices which are arranged on separately openable rear windows of vehicles, a wiper bearing which is fastened to the glass window and holds the output shaft is mechanically separated from the driving motor fastened to the rear door when the rear window is opened. When the rear window is closed, connecting elements of a connecting means between the motor shaft and output shaft latch one into another, thus restoring a form-fitting connection. However, when the rear window is open, the wiper bearing is not subject to any self-locking, and therefore the wiper arm may rotate out of the parking position. When the rear window is closed, the form-fitting connection between the connecting elements is achieved only when a resilient bolt mounted on the wiper bearing can latch axially into an elongated hole in an associated receiving part. Should there not be any overlap when the glass window is closed, the motor can be actuated, in which case there is an overlap after a maximum of half a wiper period, and the bolt can latch into the elongated hole.

SUMMARY OF THE INVENTION

The invention is based on the object of using simple measures to design a window wiper device in which the motor shaft and the output shaft are releasably connected via a connecting means, thus producing a long service life with an esthetic appearance at the same time.

The window wiper device according to the invention for a vehicle comprises a driving motor with a motor shaft which is coupled kinematically to an output shaft which is a support of a wiper arm having a wiper blade which rests on the window to be cleaned. The motor shaft and the output shaft are releasably drive-connected via a connecting means, which opens up the possibility of arranging the window wiper device, for example, on a rear window which can be opened in relation to the rear door. The connecting means comprises two connecting elements which are arranged on the motor and on a housing part connected to the output shaft and can be brought into connecting engagement. A first connecting element comprises a connecting bolt, and the second connecting element comprises a receiving part with a recess into which the connecting bolt projects in the fitted position.

In order, upon reclosing of the rear window, to prevent the connecting bolt, due to rotating out of the parking position, from rubbing along the associated receiving part and scratching the surface of the receiving part, it is provided that the receiving part is inserted into a support component in a form-fitting manner, and the receiving part is of scratch-proof design at least in the region surrounding the recess. Owing to the scratch resistance of the receiving part, the connecting bolt can be guided along the surface of the receiving part when the wiper arm position is deflected without this resulting in visible scratches or other damage. At the same time, the two-part design with a support component and receiving part opens up the possibility of providing different materials or surface coatings for the support component and the receiving part. For example, it is possible to provide a cost-effective support component, such as, for example, a plastic washer or a plastic ring, into which the receiving part, which is preferably composed of metal, is inserted. The receiving part is designed in particular as a metal plate, preferably as a steel plate, and has a scratch-proof surface which is achieved, for example, via a coating. The receiving part may furthermore be provided with an impregnating oil.

In order, during the production of the plastic support component by injection molding, to avoid the heat occurring in the process resulting in a partial evaporation of the impregnating oil on the receiving part, this being associated with adverse visual effects, according to an advantageous embodiment the receiving part is not insert molded with plastics material but rather, after the production of the support component, is connected in a form-fitting manner to the latter, for example by calking. It is therefore ensured that the heat produced in the injection molding process does not have an adverse effect on the surface of the receiving part.

According to a further embodiment, it is provided that the receiving part is designed as a flange sleeve which is composed of a scratch-proof material or has a scratch-proof surface and is inserted into the recess in the receiving part. The radially protruding flange of the flange sleeve at least partially covers the surface of the receiving part such that it is also ensured in this embodiment that a wiper arm which has been deflected out of the parking position when the rear window is open does not lead to scratching and adverse visual effect on the surface of the flange sleeve and of the receiving part when the said rear window is reclosed. In addition, this embodiment has the advantage that the receiving part does not necessarily have to have a scratch-proof surface, and therefore correspondingly simpler embodiments are suitable for the receiving part. In addition, there is the possibility of the receiving part being insert molded by the plastics material of the support component, in which case an adverse visual effect due to the production of heat during the injection molding process should impregnation and heat treatment of the surface of the receiving part be omitted should not be anticipated.

The recess in the receiving part is expediently designed as an elongated hole into which the connecting bolt projects in the fitted position. The connecting bolt is expediently held resiliently on the wiper bearing which holds the output shaft.

BRIEF DESCRIPTION OF THE DRAWINGS

Further advantages and expedient embodiments can be gathered from the other claims, the description of the figures and the drawings, in which:

DETAILED DESCRIPTION

Identical components are provided with the same reference numbers in the figures.

Figure 1:
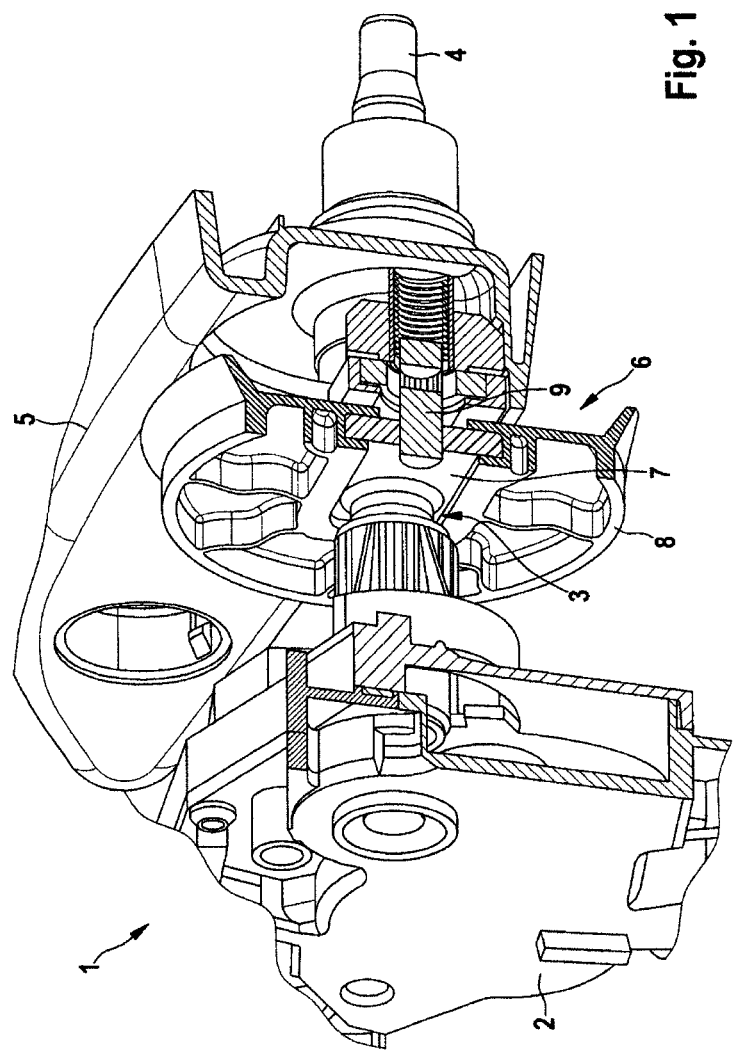
FIG. 1 shows a perspective view of a window wiper device for a vehicle, with a driving motor, the motor shaft of which is connected via a releasable connecting means to a wiper bearing in which an output shaft is held.

FIG. 1 illustrates a window wiper device 1 for a vehicle, which comprises an electric driving motor 2 with a motor shaft 3 and an output shaft 4 in a wiper bearing 5, wherein the output shaft 4 is a support of a wiper arm. The connection between the motor shaft 3 and output shaft 4 is designed releasably via a connecting means 6 which comprises a receiving part 7 in a support component 8 on the part of the driving motor 2 and a connecting bolt 9 on the part of the wiper bearing 5. The receiving part 7 is designed as a steel plate, and the support component 8, in which the steel plate 7 is held, as a plastic washer. The steel plate 7 has a first recess through which the motor shaft 3 is guided, and a second recess for receiving the connecting bolt 9.

In the fitted position, the driving motor 2 is connected fixedly to the rear door, whereas the wiper bearing 5 with the output shaft 4 is connected fixedly to the rear window which can be pivoted open in relation to the rear door. When the rear window is opened in relation to the rear door, said connection via the connecting means 6 is released by the connecting bolt 9 being pivoted out of the recess in the steel plate 7. When the rear window is closed, the connecting bolt 9 passes again into the associated recess in the steel plate 7. The connecting bolt 9 is spring-loaded and is forced into the position projecting into the recess in the steel plate 7.

Figure 2:
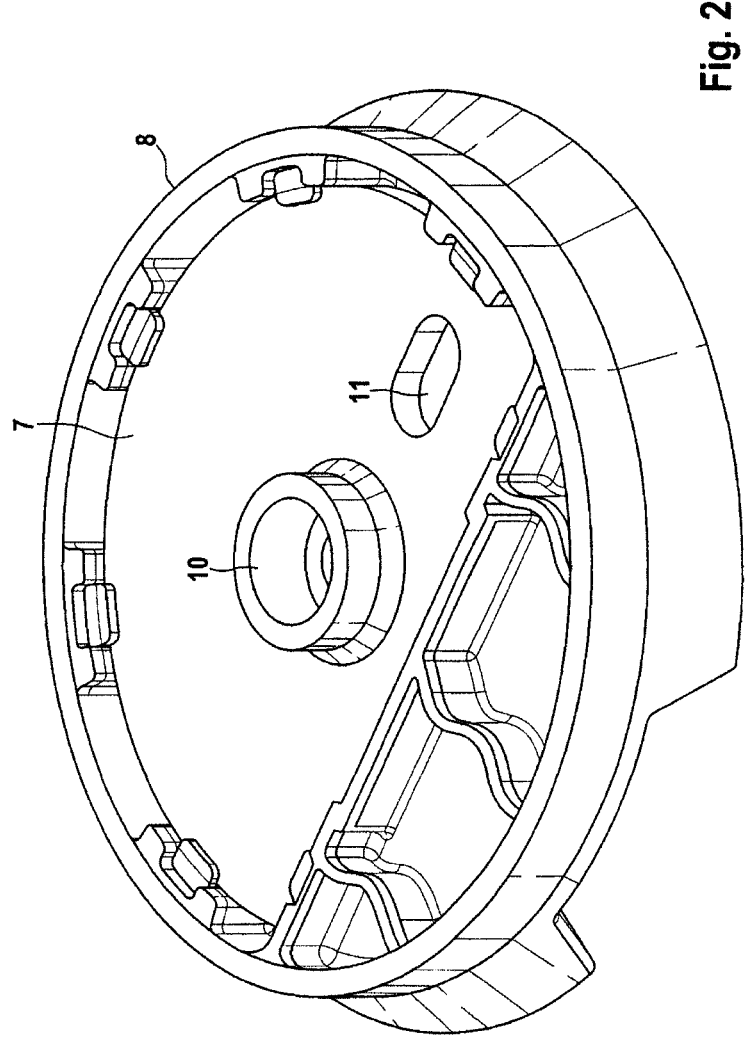
FIG. 2 shows a plastic washer as a support component of a steel plate which forms a receiving part of the connecting means, wherein the steel plate is connected in a form-fitting manner to the plastic washer and has an elongated hole for receiving a connecting bolt.

FIG. 2 shows the support component which is designed as a plastic washer 8 and includes the steel plate 7 as the receiving part, in a perspective individual illustration. The steel plate 7 is heat-treated, for example nitrocarburized, and impregnated, in particular treated with an impregnating oil and is inserted in a form-fitting manner into the round plastic washer, for example by calking. In order to minimize radial play which may occur due to manufacturing tolerances, pressing ribs running in the direction of the steel plate 7 are formed in parts of the plastic washer 8. The impregnated steel plate 7 is not insert-molded by the material of the plastic washer 8 and therefore no heat-induced visual faults in the impregnation of the steel plate 7 can occur.

In order to obtain a sufficiently high difference in hardness of the steel plate 7 from the motor shaft, the steel plate may be soft-annealed prior to the heat treatment, as a result of which the increase in hardness produced by the punching or drawing process is restored in the steel plate.

The steel plate 7 is provided with a central bore 10 for receiving the motor shaft. A recess 11 which is designed as a elongated hole and into which the connecting bolt projects in the fitted position is introduced into the steel plate 7 offset laterally from the central bore 10.

Figure 3:
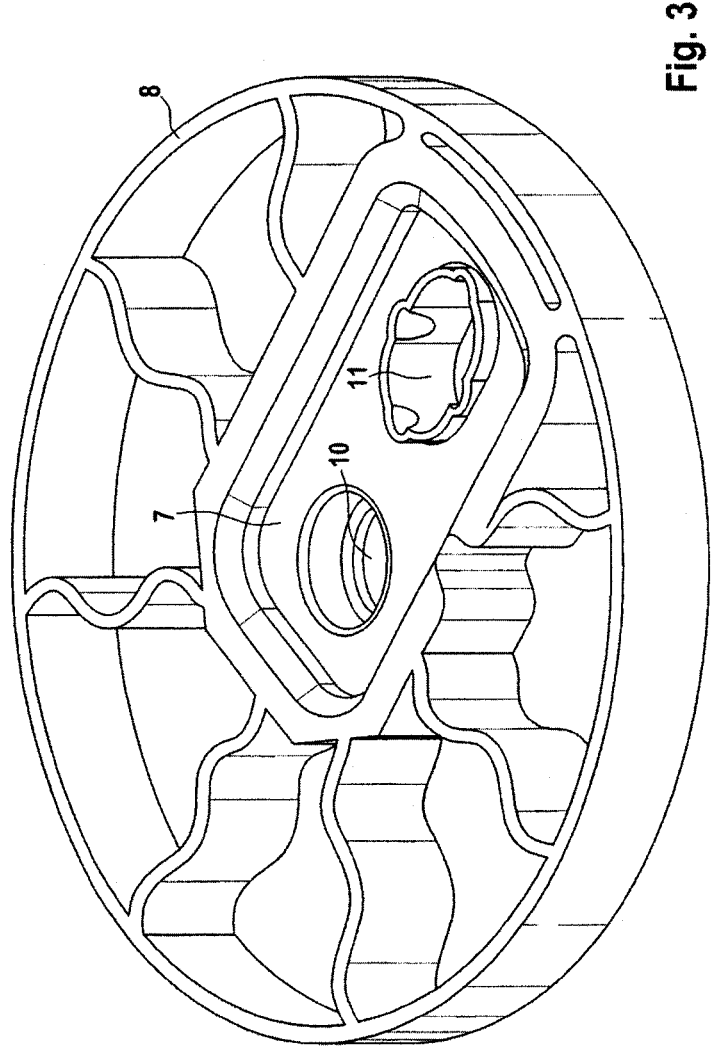
FIG. 3 shows the plastic washer with an insert-molded steel plate.

In the exemplary embodiment according to FIG. 3, the support component 8 is likewise designed as a plastic washer which is produced by injection molding. The rectangular steel plate 7 as the receiving part for the connecting bolt is insert-molded by the material of the plastic washer. As in the preceding exemplary embodiment, the steel plate 7 has a central bore 10 for receiving the motor shaft and, offset radially outward, a recess 11 which is designed as an elongated hole and is intended for receiving the connecting bolt.

Figure 4:
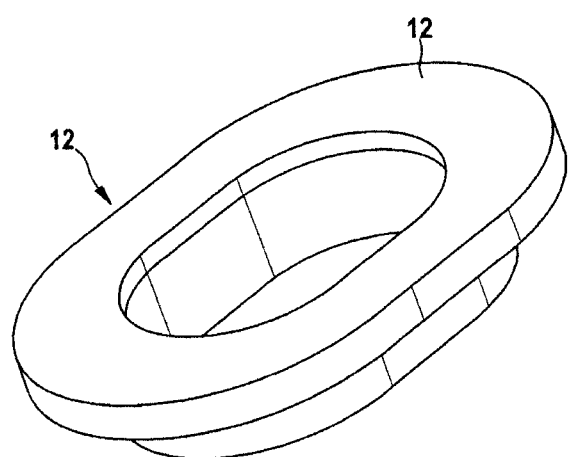
FIG. 4 shows a flange sleeve which can be inserted into the elongated hole in the steel plate according to FIG. 3.

A flange sleeve 12 (illustrated in FIG. 4) can be inserted into the recess 11, said flange sleeve being designed as a separate component and being secured in the recess 11 against dropping out by means of suitable measures, in particular by being held in a form-fitting manner in the recess 11, for example by calking. The flange sleeve 12 is designed, for example, as a heat-treated drawn steel part with an impregnated surface.

In the inserted state, the radially protruding flange 13 of the flange sleeve 12 at least partially covers the surface of the steel face 7 such that any impregnation of the steel plate 7 that is adversely visually affected by the production of heat during the insert molding with the plastics material is also only partially visible from the outside, if at all. The steel plate 7 may optionally have a galvanized surface such that said plate does not experience any increase in hardness and a robust connection between the plate and the motor shaft is ensured.

Figure 5:
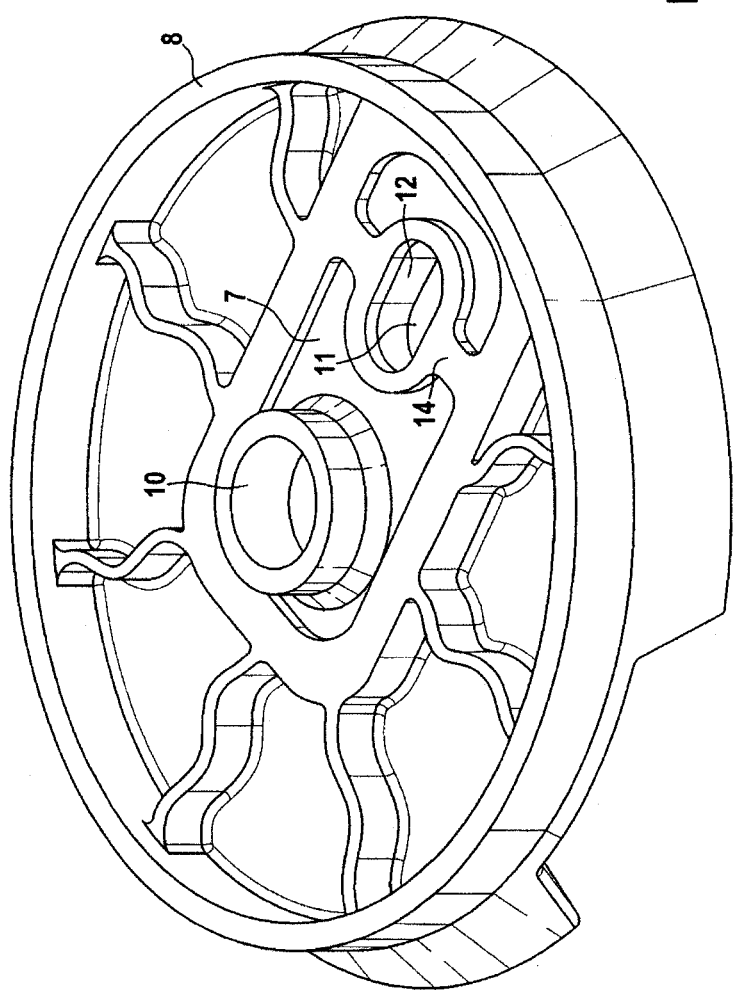
FIG. 5 shows a further exemplary embodiment of a plastic washer with an insert-molded steel plate, wherein the flange sleeve which is inserted into the recess is also insert-molded.
Figure 6:
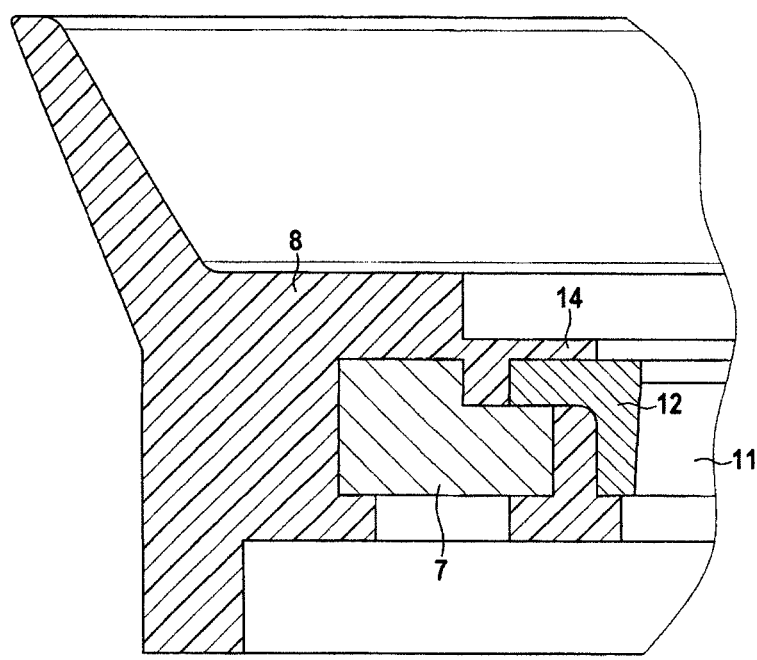
FIG. 6 shows a section through the embodiment according to FIG. 5.

As can be gathered from FIG. 5 and from the sectional illustration according to FIG. 6, both the steel plate 7 and the flange sleeve 12 can be insert-molded by the material of the plastic washer 8. Prior to the insert-molding, the flange sleeve 12 is inserted into the recess 11 in the steel plate 7, a plastic web 14 covering the protruding flange of the flange sleeve after the insert molding. Any adverse visual effects of an impregnation of the flange sleeve due to the production of heat during the plastics injection-molding process are not of importance because the flange sleeve surface which is visible from the outside is relatively small.

The invention claimed is:

1. Window wiper device for a vehicle, with a driving motor (2), a motor shaft (3) of which is coupled kinematically to an output shaft (4) carrying a wiper arm, wherein the motor shaft (3) and output shaft (4) are releasably drive-connected via a connecting means (6) which has first and second connecting elements which can be brought into connecting engagement and are connected to the driving motor (2) and to a housing part connected to the output shaft (4), wherein the first connecting element has a connecting bolt (9) and the second connecting element has a receiving part (7) with a recess (11) into which the connecting bolt (9) projects in a fitted position, wherein the receiving part (7) is inserted in a form-fitting manner into a support part (8), and the receiving part (7) is scratch-resistant at least in a region surrounding the recess (11), and wherein a flange sleeve (12) made of scratch-resistant material is inserted into the recess (11) in the receiving part (7) and a flange (13) of said flange sleeve at least partially covers a surface of the receiving part (7).

2. Window wiper device according to claim 1, characterized in that the flange sleeve (12) is injected into the support component (8).

3. Window wiper device according to claim 2, characterized in that the flange sleeve (12) is provided with an impregnated surface.

4. Window wiper device according to claim 3, characterized in that the support component (8) is designed as a plastic washer.

5. Window wiper device according to claim 4, characterized in that the recess (11) in the receiving part (7) is designed as an elongated hole.

6. Window wiper device according to claim 5, characterized in that the receiving part (7) is held in the support component (8) by calking.

7. Window wiper device according to claim 6, characterized in that the receiving part (7) is designed as a steel plate.

8. Window wiper device according to claim 1, characterized in that the flange sleeve (12) is provided with an impregnated surface.

9. Window wiper device according to claim 8, characterized in that the support component (8) is designed as a plastic washer.

10. Window wiper device according to claim 9, characterized in that the recess (11) in the receiving part (7) is designed as an elongated hole.

11. Window wiper device according to claim 10, characterized in that the receiving part (7) is held in the support component (8) by calking.

12. Window wiper device according to claim 11, characterized in that the receiving part (7) is designed as a steel plate.

13. Window wiper device according to claim 1, characterized in that the support component (8) is designed as a plastic washer.

14. Window wiper device according to claim 1, characterized in that the recess (11) in the receiving part (7) is designed as an elongated hole.

15. Window wiper device according to claim 1, characterized in that the receiving part (7) is held in the support component (8) by calking.

16. Window wiper device according to claim 1, characterized in that the receiving part (7) is designed as a steel plate.

\* \* \* \* \*